March 3, 1936.  H. B. WHITE  2,032,780
RUBBER COVERED ATTACHMENT PLUG
Filed May 2, 1931  2 Sheets-Sheet 1
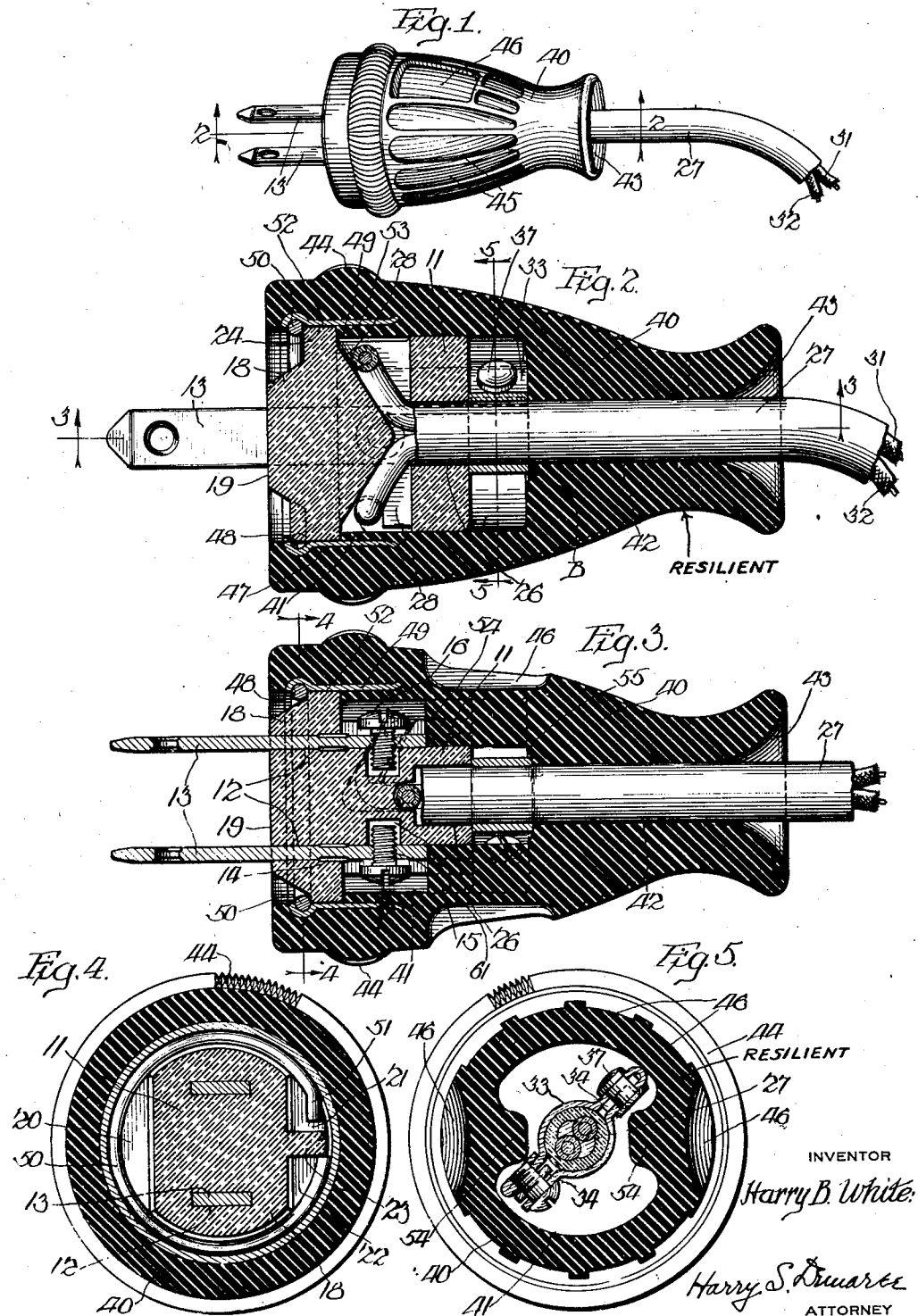
INVENTOR
Harry B. White
Harry S. Demaree
ATTORNEY

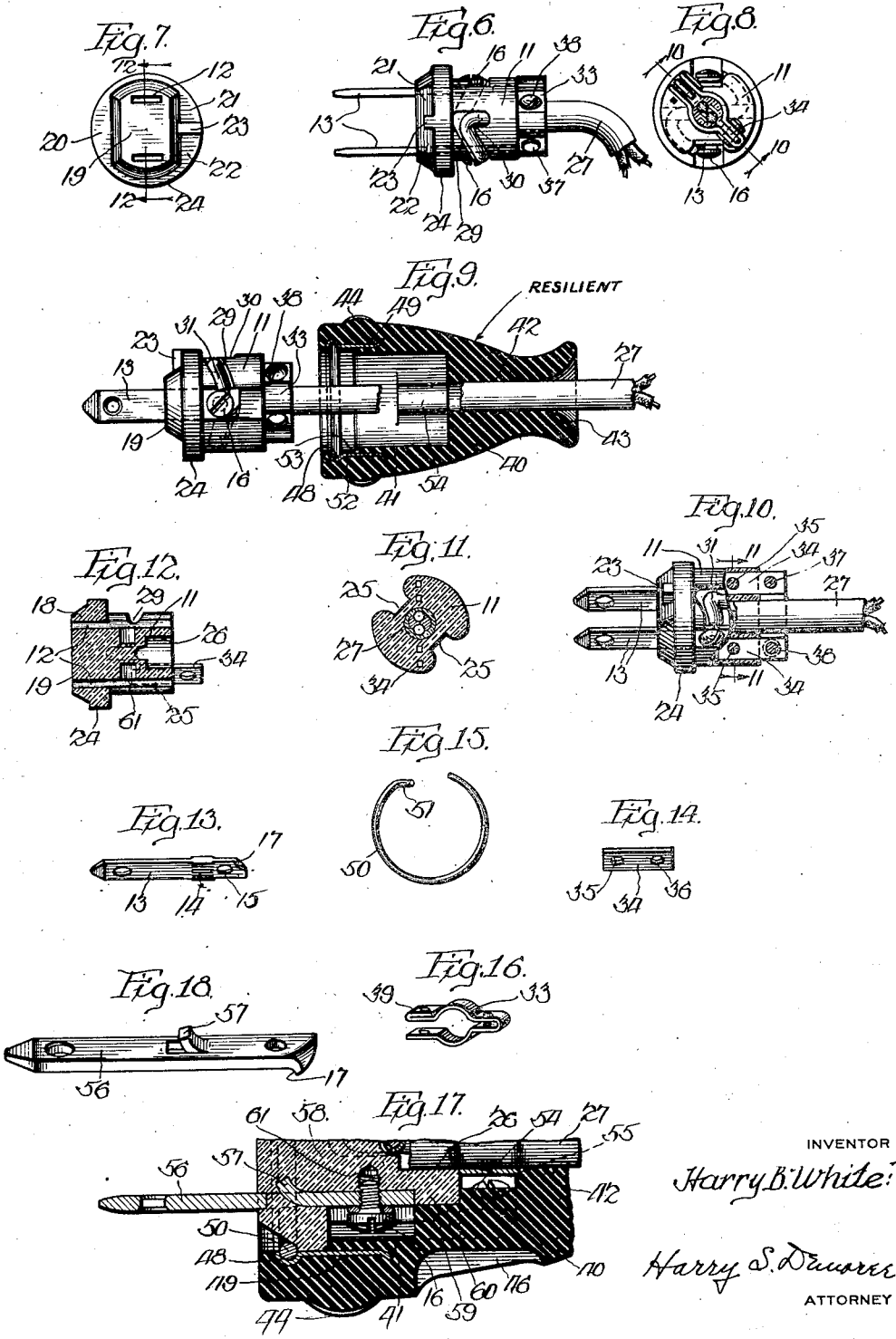

ic d Mar. 3, 1936

2,032,780

UNITED STATES PATENT OFFICE 2,032,780

RUBBER COVERED ATTACHMENT PLUG

Harry B. White, Canton, Ohio, assignor to The Hoover Company, North Canton, Ohio, a corporation of Ohio Application May 2, 1931, Serial No. 534,588

7 Claims. (Cl. 173—361)

This invention relates to electrical connecting devices, and more particularly to terminals for the flexible cable conductors in common use and providing a structure by which the wires of such flexible cable may be quickly attachable to or detachable from the conductors of a companion fitting. The exposed portions of such terminal fittings are usually formed of insulating material, except for projecting parallel blades which are connected to the wires of the cable and are adapted to be inserted through slots into engagement with electrical contacts in the companion fitting. Such fittings are subject to severe usage by being dropped upon the floor, by being tramped upon, by jerks upon the cable in various directions while the fitting itself is anchored, and in many other ways.

One of the objects of the invention is the provision of a fitting of this type which will be rugged and durable and which will hold the blades rigidly in parallelism. A further object is to provide such a fitting which can be easily handled and which can be positioned correctly by the sense of touch alone. A still further object is to provide such a fitting to which the cable will be effectively anchored so that the parts thereof can not be separated by pulls on the cord and which will reinforce and prevent sharp bends of the cable when it is pulled at an angle to the body of the fitting. Still further objects of the invention, and the novel details of structure by which such objects are attained, will be apparent from the following specification and consideration of the accompanying drawings, in which:

Fig. 1 is a view in perspective of a fitting embodying the invention;

Fig. 2 is an enlarged view in horizontal longitudinal section of the structure shown in Fig. 1;

Fig. 3 is an enlarged view in vertical longitudinal section of the structure shown in Fig. 1;

Fig. 4 is a view in vertical section taken on lines 4—4 of Fig. 3;

Fig. 5 is a view in vertical section taken on line 5—5 of Fig. 2;

Fig. 6 is a view in side elevation of the inner portion of the structure shown in Fig. 1, the outer member being removed;

Fig. 7 is a view in front elevation of the structure shown in Fig. 6;

Fig. 8 is a view in rear elevation of the structure shown in Fig. 6, the cable being shown in section;

Fig. 9 is a view in longitudinal section showing the inner and outer portions of the structure of Fig. 1 partially disassembled;

Fig. 10 is a side view showing the structure shown in Fig. 6 as partly rotated and with a part broken away on the line 10—10 of Fig. 8;

Fig. 11 is a view in transverse section taken on line 11—11 of Fig. 10;

Fig. 12 is a view in longitudinal section taken on line 12—12 of Fig. 7;

Fig. 13 is a view in perspective of one of the contact blades shown in Figs. 1 to 10;

Figs. 14 to 16 are detail views showing various of the parts shown in Figs. 1 to 12;

Fig. 17 is a fragmentary view in vertical longitudinal section showing a modified form of contact blade moulded in place; and Fig. 18 is a detail view of the contact blade shown in Fig. 17.

In general, the present invention comprises a fitting having a central body of hard insulating material in which the contact blades are rigidly held and to which the body of the cable and the individual wires thereof are anchored, and an outer cover of soft rubber, or similar flexible insulating material, which is forced endwise over the central body after the wires are connected and which is tapered to reinforce the cable and prevent sharp bends thereof by reason of its gradually increasing flexibility toward its rear end and a widening or bell mouth formed at such end. Suitable means are provided for securing the parts in assembled relation and for securing to the central body a clamping means by which the cable itself is anchored independently of the securing of the individual wires of the cable.

The embodiment of the invention shown in Figs. 1 to 16 comprises a central body member 11, preferably of moulded phenolic condensation material, now in common use as an insulating material in electrical devices, and quite rigid but tough and durable. Extending lengthwise through the body 11 are parallel rectangular openings 12 corresponding in size to the cross-section of contact blades 13, which, as shown in detail in Fig. 13, are substantially flat and provided with small sharp longitudinal ridges projecting from their surfaces at 14, so that such blades may be forced forwardly through the openings 12 and the ridges will bite into the material at the sides of the openings, thus establishing a firm contact which will hold the blades from endwise movement in use. As shown in Fig. 13, each contact blade 13 is provided with a threaded opening 15 adjacent its rear end to receive a conductor-securing screw 16, and one rear corner is preferably bent up slightly at 17 to facilitate positioning of the conductor, being also tapered at the forward end and provided with contact engaging openings as shown, if desired, to facilitate engagement with the companion fitting.

The central body 11 is roughly of cylindrical form, having a short frustro-conical portion 18 at its forward end terminating in a flat surface 19 through which the contact blades 13 extend. The portion 18 is cut away to form a recess 20 at one side of the blades, and also is cut away at the other side of the blades to form recesses 21 and 22 which are separated by a rib 23, and a continuous circular flange 24 extends outwardly between the frustro-conical portion 18 and the main portion of the central body 11. Grooves 25 are formed in the body 11 to the rear of the flange 24, their bottom portions being in continuation of the openings 12 to the base of such body portion 11. A round central recess 26 is also provided in the body 11, to receive the cable 27, and connects at its forward end with laterally divergent openings 28 each of which is adapted to receive one wire of the cable 27 and opens to the surface of the body 11 into a rearwardly and circumferentially extending groove 29 on the outside of such body portion, as shown in Fig. 6. Projections 30 are thus formed between the openings 28 and grooves 29 which are slightly rounded but necessitate a comparatively sharp bend in each of the covered wires 31 and 32 of the cable 27, and so resist any tendency toward endwise movement of the wires. It will be understood that the bared conductors in wires 31 and 32 are secured to the contact blades 13 by screws 16 and that any tendency for such screws to be accidentally loosened is thus minimized.

An anchoring clamp 33 is secured to the rear end of the central body 11, through the medium of flat studs 34, which are perforated at 35, or otherwise formed with suitable locking irregularities, and moulded in place in the body 11. The protruding portions of studs 34 are alined on opposite sides of the opening 26, and are perforated at 36, as shown in Fig. 14, to receive respectively a rivet 37 and a screw 38 as shown in Fig. 10, by which the clamp 33 is attached and operated. The clamp 33 is formed of flat spring metal bent into U-shape, with the parts adjacent the bend separated sufficiently to receive one of the studs 34 and perforated to receive the rivet 37. One of the free ends of the clamp 33 is doubled back, at 39, and both ends are perforated, the opening in the doubled end being threaded for engagement by the screw 38, by which the sides of the clamp are drawn together to compress and hold the cable 27, the sides of the clamp being preferably formed with central bends conforming somewhat to the shape of the cable.

A cover 40, of soft rubber or similar material, is provided, having a large opening 41 at its forward end to receive, and closely conform to the overall shape of, the central body 11, said cover tapering rearwardly of such opening and having a central cable-receiving opening 42 which terminates in a widely flaring mouth 43. Near its forward end, the cover may be formed with a serrated circumferential flange or ridge 44 to facilitate manipulation of the device as a whole, and for the same purpose, it is preferably formed with longitudinally extending recesses 45 in its outer surface to the rear of such flange. Enlarged recesses 46, in the same plane with the contact blades 13 when the parts are assembled, are preferably provided, being sufficiently larger than the recesses 45 as to be easily recognizable by touch, and adapted to be engaged by the thumb, and enable the user to know the position of the contact blades without looking at them. A ring 47 which is substantially cylindrical and provided with an inner circumferential groove 48 adjacent its forward end, is mounted in the cover 40, being preferably formed of metal and having its rear portion 49 embedded in the material of the cover where it surrounds the central body 11 back of the flange 24. A split spring ring 50 preferably of wire, is provided for securing the parts in assembled relation, by being snapped into place about the frustro-conical portion 18 and permitted to expand into the groove 48. As shown in Fig. 4, the ends of the ring 50 will be on opposite sides of the rib 23, and one end is preferably bent inwardly at 51 to facilitate removal by a screw driver or similar tool.

The enlarged opening in the forward end of the cover 40 is roughly cylindrical, being of slightly enlarged cross section at 52, to receive the flange 24 and provide a circumferential abutment 53 for engagement with the back of said flange and limit endwise movement of the parts. It will be understood that the size and shape of opening in the cover 40 and the ring 47 are such that the central body 11 can move longitudinally into place without circumferential stretching or distortion of the cover, and that the locking ring 50 will efficiently secure the parts in assembled relation.

Integral projections 54 as shown in Figs. 3, 5 and 9 are likewise provided which extend radially inward at diametrically opposite points, to engage in the grooves 25 of the central body 11 back of the rear ends of the contact blades 13. These projections 54 not only limit the rotative position of the cover 40 relative to the central body 11 to one of two positions, but likewise act as abutments engaging the rear ends of the contact blades 13. The axial extent of the enlarged opening is preferably slightly less than the combined length of the central body 11 and the attached clamp 33, so that, as the parts are assembled the clamp 33 will slightly distort the soft rubber at 55, about the opening 42.

In the structure shown in Figs. 17 and 18, contact blades 56 are shown which are not replaceable and cannot be inserted after the moulding of the central body 11, as are the blades 13, but are moulded in place in the central body 11, each blade having a tongue 57 struck up therefrom to form an anchoring projection. It will be understood that other irregularities of form might be used to obtain such anchorage. It is also preferable that, as shown, the central body 58 be modified from the structure of body 11 by having integral projections 59 thereon engaging the rear ends of contact blades 56, and that the projections 54 of the cover 40 be cut away at 60 to receive such projections 59. In either modification, recesses 61 are formed in the central body 11 or 58 to receive the inner ends of the screws 16.

In either construction, the cover 40 will act as an insulating shock-absorbing member which will effectively withstand the rough usage to which fittings for this purpose are subjected. The contact blades will be rigidly held, not only against endwise movement but against movement toward each other. This latter feature is of great importance, particularly when the fitting is used with a wall plug or similar companion fitting which is rigidly secured, as usage frequently entails pulls or jerks on the cable at an angle to the face of the companion fitting which tend to separate the fittings. Any looseness or flexibility of mounting of the contact blades renders separation of the fittings under these conditions comparatively easy, as the plug pivots about one edge and the blades are bent in the same direction by reason of their engagement in the slots of the companion fitting. By the rigid mounting of the contact blades in the present construction such rocking is rendered impossible, injury to the contacts of the companion fitting is prevented, and the fittings can be separated only by a pull substantially perpendicular to the face of the companion fitting.

The circumferential interlocking of the parts insures uniform positioning of the contact blades relative to the enlarged recesses 46 and so facilitates proper positioning of the blades in use, and the central body and contact blades are securely held from endwise movement relative to the cover 40 when assembled. Sharp bends in the cable are prevented, as the bend at first tends to follow the curvature of the flaring mouth of the cover and the nearer the point of bend to the clamp 33 the greater the thickness of rubber opposing such bending. The cable itself will be securely anchored by the clamp 33 which can not possibly enlarge the opening 42 and be pulled through such opening. At the same time the individual wires of the cable are sharply bent about snubbing projections and no great strain can be transmitted to their attaching screws. At the same time the bared ends of the wires and their attaching screws are located in closed, isolated recesses so that a short circuit by stray strands of the conductors is impossible. Assembly or disassembly of the structure can be easily accomplished, and the structure as a whole is durable, efficient and can be economically manufactured.

While several embodiments of the invention have been specifically shown and described, it will be understood that many changes may be made in the details of structure of the parts and in the materials used within the scope of the invention which is defined in the following claims.

I claim:

1. A terminal fitting for an electric conductor cable, comprising a central body of insulating material having a recess at its rear end to receive the cable, a contact member mounted in said body and having adjacent its rear end means for connecting a wire of the cable thereto, said body having a laterally open recess therein in which said connecting means is located and having a laterally open channel extending forwardly from said connecting means and having an opening connecting with said cable receiving recess and communicating with the forward end of said channel.

2. A terminal fitting for an electric conductor cable, comprising a central body of insulating material, contact members mounted in said central body, a one piece cover of insulating material surrounding said central body, a rigid ring mounted in said cover and having an inwardly extended flange adjacent the open end of said cover, and a spring ring positioned between said flange and said central body.

3. A terminal fitting for an electric conductor cable, comprising a central rigid body of insulating material having parallel openings therethrough, contact blades inserted from the rear into said openings and rigidly held by said body in parallel relation, a cover of insulating material surrounding said central body, and means for connecting conductors to the rear ends of said contact blades, said central body having recesses housing said connecting means, and an integral rearward projection on said central body which engages the inner sides of said blades, said cover having projections engaged in said recesses and abutting the rear ends of said contact blades to hold them from movement rearwardly.

4. A terminal fitting for an electric conductor cable, comprising an integral central body of insulating material, contact members mounted in said body and adapted to be connected to the conductors of the cable, said body having a central recess therein to receive the cable and outwardly extending openings communicating with said cable recess and having channels in its surface communicating with said openings and extending forwardly and then circumferentially in a rearward direction and adapted to receive the conductors of the cable.

5. A terminal fitting for an electric conductor cable, comprising a central body of insulating material having a recess at its rear end to receive the cable and having conductor receiving openings communicating with said cable receiving recess and extending outwardly to the surface of said body, grooves in the surface of said body communicating with said openings and extending circumferentially and rearwardly, contact members mounted in said central body and having their rear ends positioned in the rear portions of said grooves, and a cover of insulating material surrounding said cable and said central body and closing said grooves.

6. A terminal fitting for an electric conductor cable, comprising a central body of insulating material, contact members mounted in said central body, a one-piece cover of yieldable insulating material surrounding said central body, a rigid member having a portion thereof embedded in said cover and having an exposed, internal abutment therein, said central body being engageable telescopically into said cover, and a removable member positioned between said abutment and said central body.

7. A terminal fitting for an electric conductor cable, comprising a central rigid body of insulating material having longitudinally extending openings therethrough and laterally open grooves therein in extension rearwardly of said openings, contact blades located in said openings and grooves, and a cover of insulating material surrounding said central body and having integral portions thereof fitting in said grooves, whereby said central body and said cover are held from relative rotation, said portions abutting the rear ends of said blades.

HARRY B. WHITE.